United States Patent [19]
Scoville et al.

[11] Patent Number: 4,798,730
[45] Date of Patent: Jan. 17, 1989

[54] HYDROLYSIS OF A PARTIALLY EXTRACTED ROASTED AND GROUND COFFEE

[75] Inventors: Eugene Scoville, East Brunswick; Evan J. Turek, Paramus, both of N.J.; Anthony Wragg, Banbury, England; Karlina D. Cuozzo, Cliffside Park; Marshall M. Rankowitz, Englishtown, both of N.J.

[73] Assignee: General Foods Corporation, White Plains, N.Y.

[21] Appl. No.: 57,190

[22] Filed: Jun. 1, 1987

[51] Int. Cl.$^4$ ................................................ A23F 5/26
[52] U.S. Cl. ...................................... 426/432; 426/594
[58] Field of Search ................................ 426/594, 432

[56] References Cited

U.S. PATENT DOCUMENTS 4,508,745  4/1985  Fulger et al. .................... 426/432 X
4,544,567  10/1985  Gottesman .......................... 426/594

OTHER PUBLICATIONS

Sivetz et al., Coffee Technology, 1979, Avi; Wesport, Conn., pp. 348–355, 366.

*Primary Examiner*—Joseph Golian
*Attorney, Agent, or Firm*—Thomas A. Marcoux; Barbara Toop D'Avanzo; Daniel J. Donovan

[57] ABSTRACT

A method for solubilizing partially extracted roasted and ground coffee in a fixed bed reactor in the absence of any added acid catalyst is disclosed. The hydrolysis is effective to achieve a soluble solids yield of about 55% to about 68% based on the original roasted and ground coffee and it effects minimal degradation of the soluble solids generated.

10 Claims, No Drawings

HYDROLYSIS OF A PARTIALLY EXTRACTED ROASTED AND GROUND COFFEE

TECHNICAL FIELD

The present invention relates to a method of solubilizing a partially extracted roasted and ground coffee. More particularly, the invention involves hydrolyzing partially extracted roasted and ground coffee in a fixed bed reactor or a series of fixed bed reactors without the introduction of an acid catalyst. The hydrolysate thus obtained is useful for example in combination with an aqueous extract of roasted coffee for increasing the soluble coffee solids content.

BACKGROUND ART

In the soluble coffee art there has been a great deal of emphasis upon maximizing the soluble solids yield from roasted and ground coffee, most notably by varying percolation conditions. Early on in the development of instant coffee, in the pre-World War II period, solubles were leached out of roasted and ground coffee with boiling water to yield less than a 25% soluble solids yield. Morganthaler in U.S. Pat. No. 2,324,526 utilized temperatures of from 320° to 347° F. to achieve 27 percent solubles. Sivetz and Desrosier in "Coffee Technology," Avi Publishing Company, Inc., 1979, set forth the state of the art for solubles yield at page 366. Therein, it is stated that overall soluble coffee yields from roasted and ground coffee are about 40 to 50 percent and that higher yields "are not feasible in the percolator without causing compression of grounds, reducing flow rates...and otherwise jeopardizing productivity and quality," the quality of the soluble coffee already being jeopardized at the upper end of this yield range by the generation of tars and other objectionable flavors. In view of the recognized limitations on percolation, attention has been focused on other methods for increasing soluble coffee yields.

Acid-catalyzed hydrolysis of partially extracted coffee grounds to obtain an increased solids yield has been examined as one means for increasing soluble solids yield. For example, U.S. Pat. No. 2,573,406 to Clough et al. discloses a process for producing a soluble coffee which involves atmospherically extracting about 20% of the weight of the coffee, hydrolyzing a portion of the grounds in a suspension of about 1% sulphuric acid at 100° C. for about one hour, adjusting the pH of the hydrolysate, filtering the hydrolysate, combining the same with the atmospheric extract and drying the combined extract. In another, similar process described in U.S. Pat. No. 2,687,355 to Benner et al., phosphoric acid is used in place of sulphuric acid. In still another process, disclosed in U.S. Pat. No. 3,224,879 to DiNardo et al., either alkaline or acid hydrolysis is carried out directly in the extraction train on coffee grounds that have been at least atmospherically extracted. Hydrolysis directly in the extraction train eliminates the separate hydrolysis step of the prior art processes and provides for adsorption of the alkaline or acid catalyst in the mass of spent coffee grounds.

More recently, Fulger et al. in U.S. Pat. No. 4,508,745 disclose a method for hydrolyzing a coffee extraction residue material to produce mannan oligomers from DP 1 to DP 10 by preparing a slurry of spent grounds at a concentration of 5% to 60% by weight, adjusting the pH to about 0.5 to 4.0, and reacting the slurry at a temperature of 160° C. to 260° C. for 6 seconds to 60 seconds. According to Fulger et al., the aforesaid method can achieve a soluble yield increase on the order of 30% by weight from a coffee extraction residue material, said residue material having been partly extracted, as for example the spent grounds from a commercial percolation system that have been atmospherically extracted and partly thermally hydrolyzed.

However, in some instances it may be undesirable or impractical to employ an acid-catalyzed reaction to achieve an increased soluble yield. Thus, it is an object of the present invention to provide a method for treating roasted and ground coffee in the absence of an acid catalyst to achieve an increased soluble yield.

It is a further object of the invention that the method be efficient and that the soluble solids generated by the method be of an acceptable flavor quality.

SUMMARY OF THE INVENTION

It has now been found that the objects of the invention are met by a method of treating partially extracted roasted and ground coffee in a fixed bed reactor, or a series of fixed bed reactors. According to the invention, roasted and ground coffee is fed to a fixed bed reactor, said coffee having been subjected to a partial extraction wherein a percentage of the arabinogalactan, preferably a majority of the arabinogalactan, originally present in the roasted and ground coffee has been removed. Said partially extracted roasted and ground coffee is then subjected to water extraction at a temperature of about 350° F. to about 500° F. at a weight ratio of greater than about 6:1 water to grounds and preferably from about 8:1 to about 10:1 water to grounds. According to the invention, an incremental soluble solids yield is accomplished such that a total soluble solids yield of about 55% to about 68% by weight is achieved from the roasted and ground coffee.

DETAILED DESCRIPTION OF THE INVENTION

Before proceeding to a detailed description of the invention, it is necessary to define some relevant terms:

"Mannan" as used herein refers broadly to any polysaccharide d-mannose which is an aldohexose and an isomer of d-glucose, differing only by having the opposite spatial arrangement of the hydroxyl group nearest the carbonyl. The mannan found in the coffee extraction residue material may have up to 40 d-mannose units in the polysaccharide.

"Partially extracted roasted and ground coffee" is intended to mean a roasted and ground coffee material that has been partly extracted, as for example, atmospherically extracted. Generally, extraction under atmospheric conditions removes caramel and browning products, native flavor components of roasted and ground coffee, caffeine, trigonelline, chlorogenic acid, ash, arabinose, protein and coffee acids. A "partially extracted roasted and ground coffee" may also have had a percentage of the arabinogalactan extracted and preferably a majority of the arabinogalactan extracted therefrom. Moreover, a "partially extracted roasted and ground coffee" is intended also to include a roasted and ground coffee that has been hydrolyzed to the extent that a percentage of the mannans contained therein have been hydrolyzed along with the hydrolysis of galactose, arabinose, proteins and other thermal condensation products. It is contemplated that a roasted and ground coffee that is about one third to one half mannan depleted is a "partially extracted roasted and ground coffee." This may be accomplished for example, by a limited thermal hydrolysis.

The present invention relates to a method for hydrolyzing partially extracted roasted and ground coffee in a manner which is effective to generate coffee solids which are of acceptable quality and to minimize the degradation of said solids after generation. Contrary to the teachings of the prior art, particularly the Sivetz and Desrosier text, soluble solids yields of greater than 55% by weight, based on the starting roasted and ground coffee, may be accomplished according to the invention in a fixed bed reactor with minimum loss of soluble solids after generation.

According to the invention, it has been found that soluble coffee solids generated by thermal hydrolysis are susceptible to a series of degradation products. Initially, soluble coffee solids may degrade to form what may be termed intermediate soluble coffee solids such as hydroxymethyl furfural. Thereafter, a further degradation to volatile acids and/or insoluble coffee solids may occur. The present invention has been found to be effective in minimizing the degradation after generation of soluble coffee solids to intermediate soluble coffee solids and therefrom to insoluble coffee solids. Whereas the degradation to intermediate soluble coffee solids does not reduce the soluble yield in itself, it has been found that as the relative level of intermediate soluble solids increases, a negative effect on coffee flavor results. The method of the present invention is effective, however, to achieve a soluble yield of greater than 55% by weight with a minimal degradation of generated soluble solids to intermediate and insoluble coffee solids.

Partially extracted roasted and ground coffees which are suitable for use as a feed material for the method of the present invention may be obtained by any method which is known in the art. For example, soluble solids extraction in an extraction battery such that a percentage, and preferably a majority, of the arabinogalactan is extracted from a roasted and ground coffee is suitable. Moreover, soluble solids extraction in an extraction battery such that a percentage of the mannans, generally from one third to one half of the mannans initially present, is extracted is effective to produce a partially extracted roasted and ground coffee.

Other suitable methods exist for generating a partially extracted roasted and ground coffee for use in the present invention. For example, roasted and ground coffee may be extracted in a vessel by slurrying said coffee with water at a temperature and pressure and for a period of time effective to form a partially extracted roasted and ground coffee. Similarly, roasted and ground coffee may be placed in a reactor and water passed through the reactor at a temperature and pressure and for a period of time effective to produce a partially extracted roasted and ground coffee.

According to the invention, partially extracted roasted and ground coffee is placed in a fixed bed reactor, or a series of fixed bed reactors. The fixed bed reactor design is not critical to the invention provided the reactor is able to withstand the temperature and pressure conditions described herein below. Design of the reactor is considered to be well within the ordinary skill of one in the art employing recognized engineering principles. It is to be recognized, however, that variations in reactor design impact such operating parameters as draw off factor, as described hereinafter. A percolation column from a commercial extraction battery is an example of a fixed bed reactor which is suitable for use in the invention. Preferably, 2 to 3 fixed bed reactors are employed in series, but the number of reactors is also not critical.

Water is fed to a fixed bed reactor containing partially extracted roasted and ground coffee either at the top or at the bottom of said reactor. Typically the water is fed to the top of the reactor and flows downwardly through the coffee. In a case where more than one reactor is being used, the aqueous stream containing coffee solids which exits the bottom of the first reactor, hereinafter referred to as "extract", is then fed to a second reactor, typically at the top of said reactor, and so on until the extract exits the last reactor in the series. The temperature of the water as it enters the first column is critical to the operation of the invention and is generally about 380° F. to about 450° F. and typically about 395° F. to about 425° F. The pressure within the reactor or reactors is maintained such that the water within the vessel does not flash at the system temperature. This is typically accomplished by throttling the exit flow so as to maintain the pressure within the reactor as desired.

It has been found that the relationship between the residence time of the coffee grounds and the residence time of the extract within the reactors is critical to accomplishing the objects of the invention. It has been found that the extract residence time must be significantly less than the grounds residence time to avoid an unacceptable level of soluble solids degradation to intermediate soluble coffee solids and/or volatile acids and thenceforth to insoluble coffee solids. In conventional percolation, the grounds residence time is approximately 225 to 275 minutes for a typical six column operation. About 80% of that residence time is under high temperature, thermal hydrolysis conditions. According to the present invention, the grounds residence time is about 30 to about 120 minutes. By contrast, the extract residence time is only about 7 to about 45 minutes, preferably about 30 to about 40 minutes. This short extract residence time, particularly as compared to the grounds residence time, has been found to be critical to producing a coffee extract which contains coffee solids of a desirable flavor while simultaneously achieving the desired soluble yield.

The ratio of water or extract to coffee grounds, typically referred to as the draw off factor, is also critical to the invention. A draw off factor is calculated by dividing the total weight of coffee extract produced from a given amount of coffee by the weight of said coffee. According to the invention, a draw off factor of greater than about 6 and preferably about 8 to 10 is necessary to achieve the objects of the invention, particularly to hydrolyze the partially extracted roast and ground coffee and remove at least 50% of the mannan fraction, preferably at least 75% and most preferably at least 90% and achieve a soluble solids yield of about 55% to about 68% by weight based on the original roasted and ground coffee. The soluble yield is dependent to some degree on the blend of coffees being extracted. As is known in the art, Robusta coffees are more easily extracted than Arabica coffees, for example.

The superficial velocity of the aqueous medium as it flows through the coffee grounds in the reactor is also critical to achieving the objects of the invention. Superficial velocity as described herein defines the velocity of the aqueous medium through an empty column. The superficial velocity will vary depending on the geometry of the reactor or reactors employed. However, a superficial velocity such that the desired relationship between extract residence time and grounds residence time is accomplished is essential to the objects of the invention. If a superficial velocity is too low for a given reactor geometry, the extract residence time will be too high and an unacceptable level of soluble solids degradation will result. However, if a superficial velocity is too high for a given reactor geometry, the extract residence time may be so short that a draw off factor well outside the preferred range of 8 to 10 will be necessary to achieve the desired soluble yield of greater than 55% by weight. Furthermore, bed instability or bed compression will result from too high a superficial velocity. Whereas extremely high superficial velocities may be effective to achieve the objects of the invention at very high draw off factors, such an operation is relatively inefficient because the extract which exits the system is at a very low concentration and requires a high level of evaporation to increase the concentration to a useful level. Superficial velocity will range from about 0.50 to 1.50 dependent upon reactor geometry. Suitably, the reactor will have a length to diameter ratio of from 2:1 to 20:1.

The extract which exits the final reactor of the series may be dried to form a coffee powder. Alternatively, the extract may be added to another coffee extract, as for example the coffee extract which is produced when partially extracting roasted and ground coffee to form a partially extracted roasted and ground coffee. In any case, the extract produced according to the invention contains soluble solids of an acceptable flavor and aroma character and contains an acceptable level of volatile acids, intermediate solids and insoluble coffee solids.

EXAMPLE 1

Roasted and ground robusta coffee was partially extracted in an extraction battery according to the following method. Fresh roasted and ground coffee was loaded into an extraction column and the column was added to the end of the extraction battery such that it was the freshest column on line. The extraction battery comprised five columns on line at any given time with extraction water being fed to the most spent column at a temperature of about 350° F. The water passed upwardly through the most spent column and then the second most spent column until it reached the freshest column and finally exited as coffee extract. After a period of about 50 minutes the first or most spent column was removed from the extraction battery and a new fresh column was added at the end of the battery. This procedure was repeated with fresh columns being added and most spent columns being removed from the extraction battery. The roasted and ground coffee in the spent column after it was removed from the extraction battery was found to be partially extracted roast and ground coffee. A majority of the arabinogalactan had been extracted from the roasted and ground coffee and about 40% of the mannan had been extracted therefrom. A soluble solids yield of about 53% by weight was effected in the extraction battery.

The partially extracted roasted and ground coffee was fed to an extraction column with a length to diameter ratio of 2:1. Water was fed as an extracting stream to the top of said extraction column at a temperature of about 400° F. The weight ratio of extracting stream to original roasted and ground coffee was about 10:1, which corresponds to a draw off factor of 10. The residence time of the partially extracted roasted and ground coffee in the extraction column was about 60 minutes and the residence time of the extracting stream was about 15 minutes. The extracting stream exited said extraction column with a soluble solids concentration of about 1%.

The partially extracted roasted and ground coffee which was hydrolyzed in the extraction column of the present invention was found to be substantially mannan depleted. Said hydrolyzed roasted and ground coffee contained about 10% of the mannan originally present in the roasted and ground coffee. An incremental soluble solids yield of about 10% by weight was accomplished in the extraction column of the present invention. Thus, the total soluble solids yield accomplished was about 63% by weight based on the original roasted and ground coffee. Said extract was evaporated to a concentration of about 25% by weight and added back to the coffee extract produced in the extraction battery, said combination was concentrated and dried to form a soluble coffee product. The resultant coffee was tested by a panel of experts and found to be of acceptable flavor quality.

EXAMPLE 2

Partially extracted roasted and ground coffee was loaded into two extraction columns, each column having a 10 inch diameter and a length of 16.5 feet. Water was fed to the top of the first or more spent column at a temperature of about 410° F. The water passed downwardly through the partially extracted roasted and ground coffee, exited the bottom, and then was fed to the top of the second extraction column in the series at a temperature of about 400° F. The total extract residence time in the two column series was about 27 minutes. After about 42 minutes, the more spent column was removed from the series and a new second extraction column containing partially extracted roasted and ground coffee was added to the series. Thus, the initial second extraction column became the first or more spent column in the series. This procedure was then repeated every 42 minutes. The total residence time for the partially extracted roasted and ground coffee was about 84 minutes. A total draw off factor of about 8 was effected.

The partially extracted roasted and ground coffee which was hydrolyzed in the two column series was found to be substantially mannan depleted, containing only about 10% of the mannan originally present in the roasted and ground coffee. An incremental soluble solids yield of about 31% by weight was thus accomplished, giving a total soluble solids yield of about 62% by weight from the original roasted and ground coffee. The extract produced in said two column series was found to be of an acceptable flavor quality. Said extract was evaporated to a concentration of about 55% and combined with the first extraction, the combination was concentrated, and then dried to form a soluble coffee product. The coffee product was tested by a panel of experts and found to be of acceptable flavor quality.

We claim:

1. A method of solubilizing a partially extracted roasted and ground coffee, said coffee having a majority of the arabinogalactan extracted therefrom, which comprises:

contacting said partially extracted roasted and ground coffee with water at a temperature of about 380° F. to about 450° F. in a fixed bed reactor for a period of time such that the partially extracted roast and ground coffee residence time in the reactor is about 30 minutes to about 120 minutes and extract residence time in the reactor is about 7 minutes to about 45 minutes, said extract residence time being at all times significantly less than said coffee residence time to minimize degradation of soluble solids, the ratio of extract to coffee, the draw off factor, being at least 6, the superficial velocity of the extract as it flows through the coffee in the reactor ranging from 0.50 to 1.5, pressure being maintained within the reactor such that the water within the reactor does not flash, said contact being effective to achieve hydrolysis of said partially extracted roasted and ground coffee and effective to remove at least 50% of the mannan fraction, and effective to achieve a soluble solids yield of about 55% to about 68% by weight based on the starting roasted and ground coffee.

2. The method of claim 1 wherein said partially extracted roasted and ground coffee is produced by extracting roasted and ground coffee in an extraction battery.

3. The method of claim 1 wherein said partially extracted roasted and ground coffee has been subject to atmospheric extraction, and has extracted native flavor components of roasted and ground coffee, caffeine, trigonelline, chlorogenic acid, ash, arabinose, protein, coffee acids and caramel and browning products.

4. The method of claim 2 wherein from said partially extracted roasted and ground coffee has been extracted from one third to one half of the mannan originally present in the roasted and ground coffee.

5. The method of claim 1 wherein said contact is at a temperature of about 395° F. to about 425° F.

6. The method of claim 1 wherein said fixed bed reactor is replaced by a series of fixed bed reactors.

7. The method of claim 6 wherein said series of fixed bed reactors is two fixed bed reactors.

8. The method of claim 1 wherein the draw off factor is from 8 to 10.

9. The method of claim 1 wherein at least 75% of the mannan fraction is removed during hydrolysis.

10. The method of claim 1 wherein at least 90% of the mannan fraction is removed during hydrolysis.

* * * * *